(12) United States Patent
Unnikrishnan (10) Patent No.: US 10,996,759 B2
(45) Date of Patent: May 4, 2021

(54) ADJUSTABLE TACTILE FEEDBACK WITH FORCE SENSORS AND HAPTIC ACTUATORS

(71) Applicant: RAZER (ASIA-PACIFIC) PTE. LTD., Singapore (SG)

(72) Inventor: Sreenath Unnikrishnan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/627,069

(22) PCT Filed: Jun. 30, 2017

(86) PCT No.: PCT/SG2017/050329
§ 371 (c)(1),
(2) Date: Dec. 27, 2019

(87) PCT Pub. No.: WO2019/004930
PCT Pub. Date: Jan. 3, 2019

(65) Prior Publication Data
US 2020/0142488 A1 May 7, 2020

(51) Int. Cl.
*G06F 3/01* (2006.01)
*G06F 3/0354* (2013.01)

(52) U.S. Cl.
CPC .......... *G06F 3/016* (2013.01); *G06F 3/03543* (2013.01)

(58) Field of Classification Search
CPC .............................. G06F 3/016; G06F 3/03543
See application file for complete search history.

(56) References Cited

U.S. PATENT DOCUMENTS

| 8,098,234 | B2 | 1/2012 | Lacroix et al. |
| 8,232,969 | B2 | 7/2012 | Grant et al. |
| 8,378,979 | B2 | 2/2013 | Frid et al. |
| 8,482,517 | B1 | 7/2013 | O'Keeffe et al. |
| 9,417,707 | B2 * | 8/2016 | Ng .......... G06F 3/0238 |
| 9,448,631 | B2 | 9/2016 | Winter et al. |
| 9,483,771 | B2 | 11/2016 | Weerasinghe |
| 9,513,726 | B2 * | 12/2016 | Tang ............. G06F 3/0317 |
| 10,437,359 | B1 | 10/2019 | Wang et al. |

(Continued)

FOREIGN PATENT DOCUMENTS

| EP | 2375314 A1 | 10/2011 |
| EP | 3141987 A1 | 3/2017 |

OTHER PUBLICATIONS

Extended European Search Report dated Jun. 9, 2020, 7 pages, for the corresponding European Patent Application No. 17916121.1.

(Continued)

Primary Examiner — Sejoon Ahn
(74) Attorney, Agent, or Firm — Polsinelli PC (57) ABSTRACT

A method, a computer-readable medium, and an apparatus for customizing an input device are provided. The method may include setting a set of parameters associated with actuating a button of the input device. The set of parameters may include at least one of a threshold force for actuating the button or a threshold displacement for actuating the button. The method may receive a press of the button. The method may provide a tactile feedback based on the set of parameters in response to the press of the button.

18 Claims, 7 Drawing Sheets

Top View

(56) References Cited

U.S. PATENT DOCUMENTS

| | | | |
|---|---|---|---|
| 10,719,141 B2* | 7/2020 | Tan | G06F 3/03543 |
| 2007/0069088 A1* | 3/2007 | Bidiville | G06F 3/03543 |
| | | | 248/188.9 |
| 2008/0316171 A1 | 12/2008 | Shahoian et al. | |
| 2009/0046062 A1* | 2/2009 | Sayyadi | G06F 3/03543 |
| | | | 345/158 |
| 2010/0201624 A1* | 8/2010 | Ng | G06F 3/03543 |
| | | | 345/163 |
| 2010/0245249 A1* | 9/2010 | Ng | G06F 3/03543 |
| | | | 345/166 |
| 2011/0028194 A1* | 2/2011 | Tang | G06F 3/03543 |
| | | | 463/1 |
| 2011/0267181 A1 | 2/2011 | Kildal | |
| 2012/0287053 A1 | 11/2012 | Bos et al. | |
| 2013/0321273 A1 | 12/2013 | O'Keeffe et al. | |
| 2014/0144764 A1* | 5/2014 | Wilson | H01H 9/161 |
| | | | 200/5 R |
| 2014/0225832 A1 | 8/2014 | Wright et al. | |
| 2014/0230575 A1 | 8/2014 | Picciotto et al. | |
| 2015/0241972 A1 | 8/2015 | Lacroix | |
| 2015/0253850 A1 | 9/2015 | Behles et al. | |
| 2016/0062464 A1 | 3/2016 | Moussette et al. | |
| 2016/0246413 A1 | 8/2016 | Kano et al. | |
| 2017/0075563 A1 | 3/2017 | Bauer et al. | |
| 2018/0136728 A1* | 5/2018 | Unnikrishnan | H01H 13/85 |

OTHER PUBLICATIONS

International Search Report and Written Opinion, dated Mar. 9, 2018, for the corresponding International Application No. PCT/SG2017/050329 in 9 pages.

Chang, Dean, "Haptics: Gaming's New Sensation", Entertainment Computing, Computer 35.8 (2002): 84-86.

* cited by examiner

ADJUSTABLE TACTILE FEEDBACK WITH FORCE SENSORS AND HAPTIC ACTUATORS

TECHNICAL FIELD

Various aspects of this disclosure generally relate to human-computer interaction, and more particularly, to customization of the tactile feedback of an input device.

BACKGROUND

Computing technology has seen a many-fold increase in capability ever since it was created. Processors work at ever higher rates; memories are ever larger and always faster; mass storage is larger and cheaper every year. Computers now are essential elements in many aspects of life, and are often used to present three-dimensional worlds to users, in everything from games to scientific visualization.

Human-computer interaction (HCI) researches the design and use of computer technology, focused on the interfaces between humans (users) and computers. Humans interact with computers in many ways. The interface between humans and computers is crucial to facilitating this interaction. The interface between the user and the computer has not seen the same rate of change as the computing technology. For example, screen windows, keyboard, monitor, and mouse are the standard, and have seen little change since their introduction. Little thought is given to the human-computer interface, although most of the user's experience with the computer is dominated by the interface between the user and the computer.

As computers continue to increase in capability, the human-computer interface becomes increasingly important. The effective bandwidth of communication with the user is not sufficient using only the traditional mouse and keyboard for input and monitor and speakers for output. More capable interface support is desirable to accommodate more complex and demanding applications.

Traditional buttons on a computer mouse do not offer any sort of customization to the user. Therefore, it may be desirable to allow customization of the buttons to improve user experience in operating a computer mouse.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For human-computer interaction, the tactile feedback may provide an enhanced user and gaming experience. In an aspect of the disclosure, a way for users to precisely customize the tactile feedback of their input device using force sensor and haptic actuators is provided. Traditional mouse buttons may be replaced by mouse buttons that provide tactile feedback using high definition haptic actuators along with force sensors installed in the body of the mouse. Using a custom-made software provided to the user, the user may be able to set or adjust the force curve of the mouse button to improve user and gaming experience.

In an aspect of the disclosure, a method, a computer-readable medium, and an apparatus for customizing an input device are provided. The method may set or adjust a set of parameters associated with actuating a button of the input device. The set of parameters may include at least one of a threshold force for actuating the button or a threshold displacement for actuating the button. The method may receive a press of the button. The method may provide a tactile feedback based on the set of parameters in response to the press of the button.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of human-computer interaction will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In one embodiment, a method, a computer-readable medium, and an apparatus for the customization of buttons on an input device are provided. The apparatus may allow for more customization for the buttons on an input device than possible from traditional input devices in the market, either by changing the force curve of the button or by changing the audio which the haptics can then react to. The apparatus may allow for users to save separate tactile feedback profiles (e.g., as defined by corresponding force curves) for different uses of their input device, as they see fit. The tactile feedback profiles may be saved onto the software for automatic switching when the user launches different games or programs. In one embodiment, the apparatus may allow for customization of the force among other characteristics of the button. Other customizable characteristics of the button may be the travel before actuation which is independent of the force, or whether the user wants a single click or a double click button (traditional mouse buttons are "double-click" in that there two clicks per actuation, once when the button is actuated and another when the button is released). There may still be other customizable characteristics such as how "crisp" or "mushy" the feeling of a button is (which may be determined by the slope of the force curve before and after the actuation point), etc.

Figure 1A:
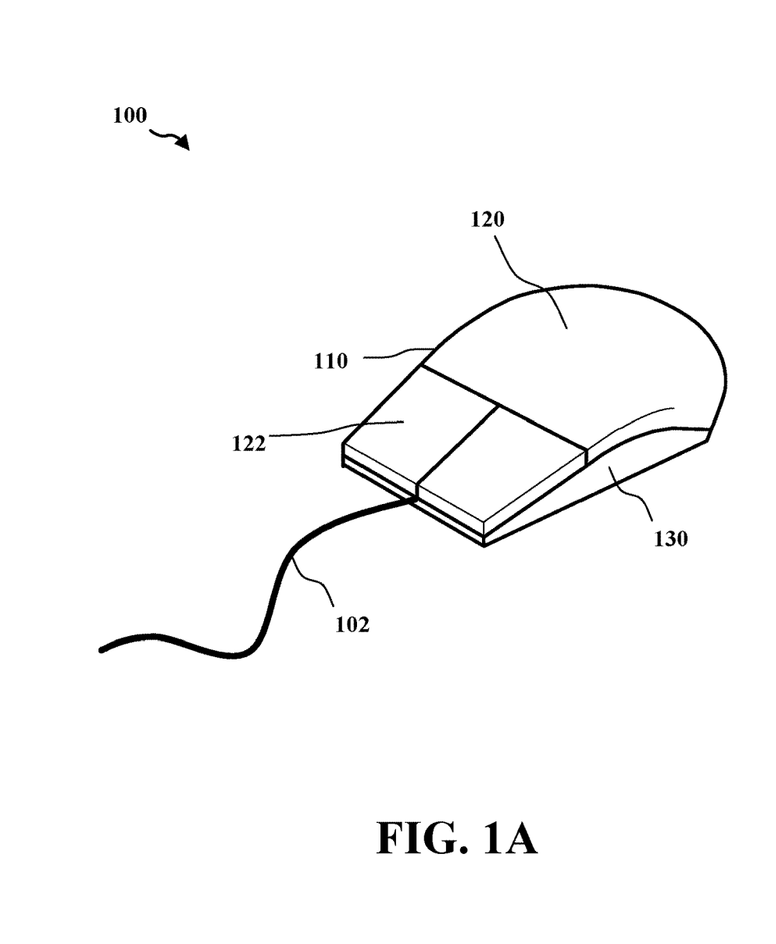
FIG. 1A is a diagram showing an assembled view of a mouse for communication with a processor-based device according to various embodiments.
Figure 1B:
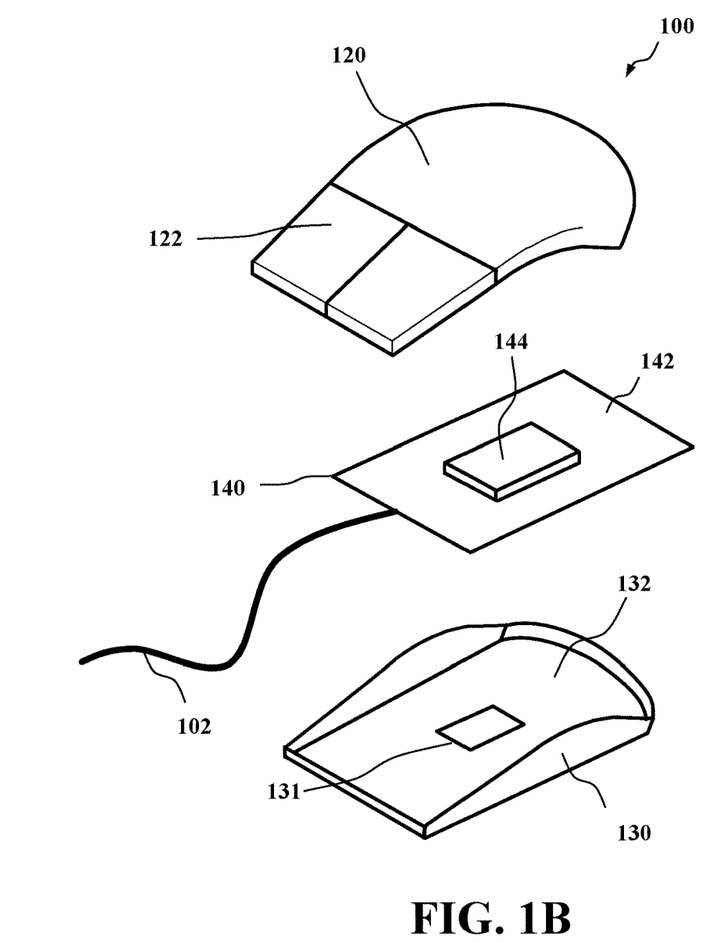
FIG. 1B is a diagram showing an exploded view of the mouse of FIG. 1A according to various embodiments.

FIG. 1A is a diagram showing an assembled view of a mouse 100 for communication with a processor-based device according to various embodiments. FIG. 1B is a diagram showing an exploded view of the mouse 100 of FIG. 1A according to various embodiments. As shown, the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components 140 of the mouse 100.

According to various embodiments, the internal components 140 of the mouse 100 may include an electronic circuit module 142 and a motion detection module 144. The electronic circuit module 142 may include printed circuit boards, or any other suitable electronic circuit. The electronic circuit module 142 may be connected to the processor-based device, such as a computer, via a cable 102. The motion detection module 144 may include optical sensors, or laser sensors, or track ball mechanism, or any other electronic or mechanical components that may be configured to detect movement of the mouse 100. The motion detection module 144 may further be configured to be in communication with the electronic circuit module 142 such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit module 142 of the mouse 100 for a user to provide inputs to the processor-based device, to which the mouse 100 may be connected, via clicking of the one or more buttons 122 of the mouse 100. The one or more buttons 122 may include a click button, or a scroll button, or a push button, or any combination of suitable buttons. The one or more buttons 122 may be located at any region of the cover portion 120 as desired.

According to various embodiments, the housing 110 may include a base surface. The base surface may be configured to face a tracking surface on which the mouse 100 may be placed on. Accordingly, the base surface of the housing 110 may be an exterior surface of a substantially flat section 132 of the base portion 130 of the housing 110. Thus, the mouse 100 may be placed with the base surface of the base portion 130 of the housing 110 substantially flat against or substantially parallel to a mouse pad, a table top, or any other suitable tracking surfaces on which the mouse may be used.

According to various embodiments, the base portion 130 of the housing 110 may include a window 131. The window 131 may be an opening or a transparent portion of the base portion 130. Accordingly, the window 131 may allow the motion detection module 144 to detect relative movement between the mouse 100 and the tracking surface on which the mouse 100 may be placed and moved.

Figure 2:
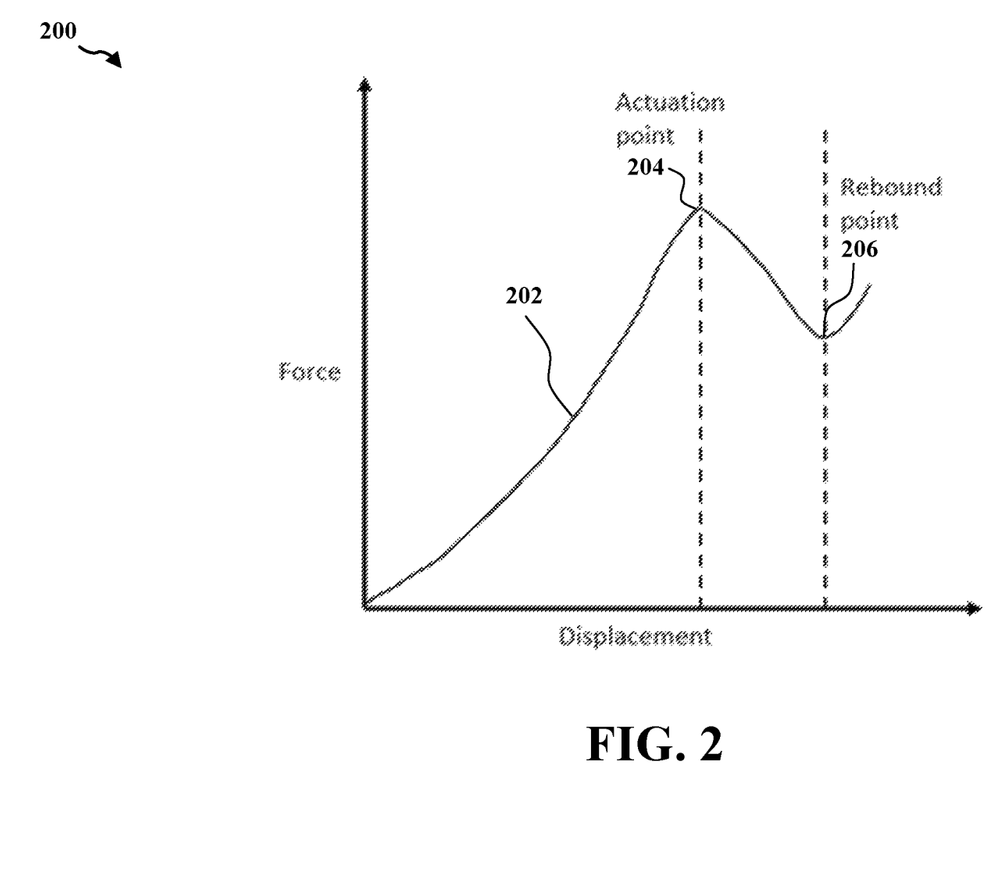
FIG. 2 is a diagram illustrating an example of a force curve for a button.

The tactile feel of a button (e.g., one of the one or more buttons 122) may be studied by its force curve, which plots the force applied on the button vs. the displacement of the button as the button is being actuated. FIG. 2 is a diagram 200 illustrating an example of a force curve 202 for a button. When a button (e.g., one of the one or more buttons 122) is pressed, the force applied on the button and the displacement of the button may gradually increase, as illustrated by the force curve 202. The displacement of the button may be caused by the press of the button. When the combination of force and displacement climbs to the actuation point 204, the press of the button may be registered as an input and a tactile feedback may be provided. In one embodiment, the actuation point 204 may define a force threshold for actuation and a displacement threshold for actuation. To actuate the button, at least one of the force threshold for actuation and the displacement threshold for actuation may need to be satisfied. For example, the button may be actuated when the force applied on the button exceeds the force threshold for actuation and/or the displacement of the button exceeds the displacement threshold for actuation.

In one embodiment, after the actuation point 204 is reached, the force applied on the button and the displacement of the button may gradually decrease. When the combination of force and displacement falls to the rebound point 206, the button may be reset and may be actuated again if the actuation point 204 is reached. In one embodiment, the tactile feedback trigger at the actuation point 204 may stop on or before the rebound point 206 is reached.

In one embodiment, the rebound point 206 may define a reset force threshold and a reset displacement threshold. To reset the button, at least one of the reset force threshold and the reset displacement threshold may need to be satisfied. For example, the button may be reset when the force applied on the button is less than the reset force threshold and/or the displacement of the button is less than the reset displacement threshold.

In one embodiment, a button may have force sensors and a haptic feedback mechanism to provide tactile feedback to a user when the button is pressed. In such an embodiment, a user may be able to set or adjust the force curve 202, e.g., by setting or adjusting the actuation point 204 and/or the rebound point 206, to set or adjust the tactile feedback or tactile feel of the button. In one embodiment, the force curve 202 may be set or adjusted based on user's preference and/or based on the application or program for which the mouse is being used.

Figure 3:
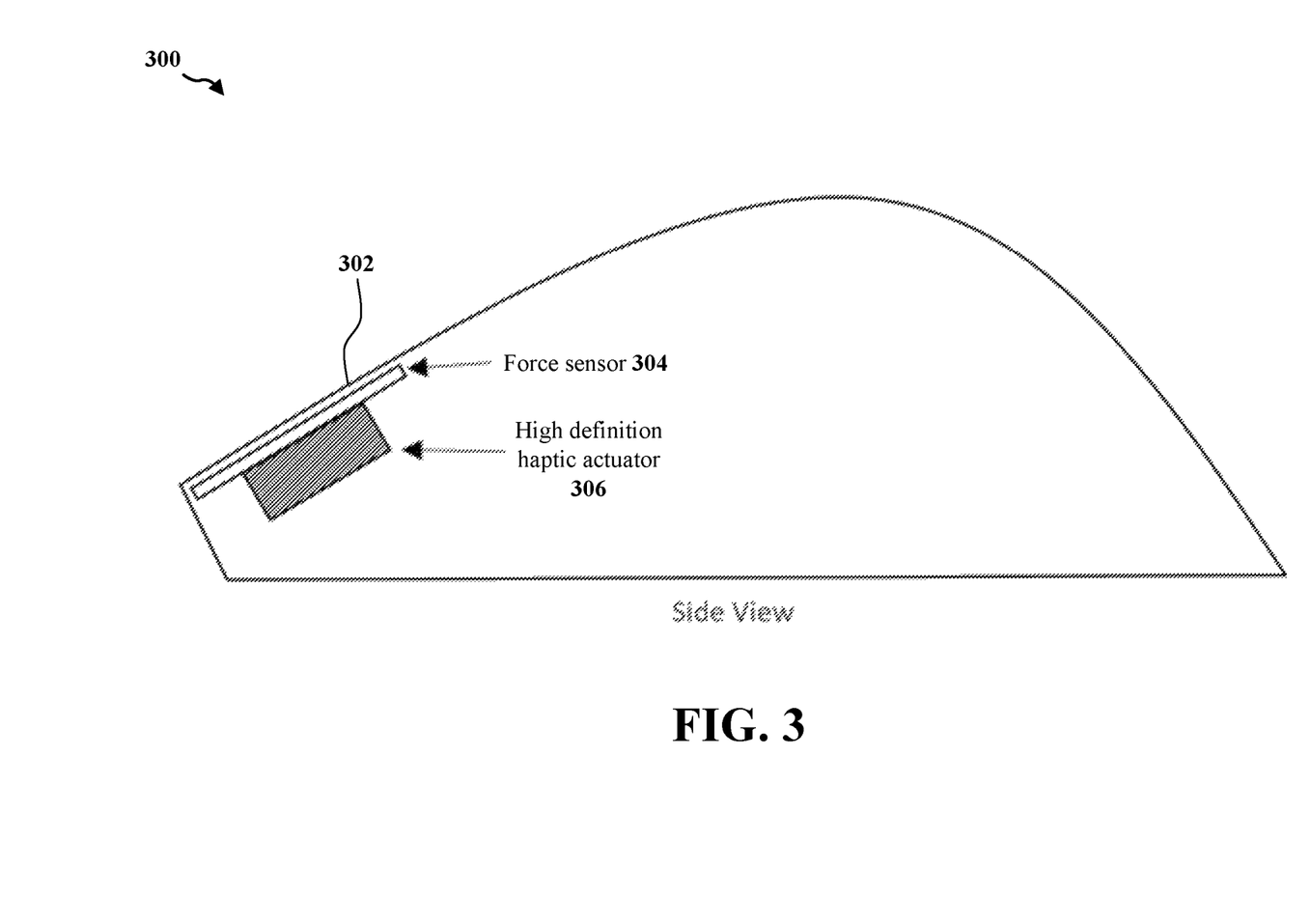
FIG. 3 is a diagram illustrating a side view of an example of a computer mouse that may provide customized tactile feedback.

FIG. 3 is a diagram illustrating a side view of an example of a computer mouse 300 that may provide customized tactile feedback. In one embodiment, the mouse 300 may have a flexible, thin force sensor 304 embedded below the top shell 302 of the mouse 300. The top shell 302 may be slightly flexible in that it transfers any forces applied to it to the force sensor 304 below. A haptic actuator 306 may be located at a location such that it can transmit the tactile feedback to the surface (e.g., the top shell 302). In one embodiment, the haptic actuator 306 may be below the force sensor 304 or somewhere nearby. In one embodiment, the haptic actuator 306 may be a high definition haptic actuator.

In one embodiment, when an area of the top shell 302 close to the force sensor 304 is pressed, the force sensor 304 may detect a force. In response to the detected force, the haptic actuator 306 may generate a tactile feedback based on a force curve (e.g., the force curve 202) associated with the area of the top shell 302.

Figure 4:
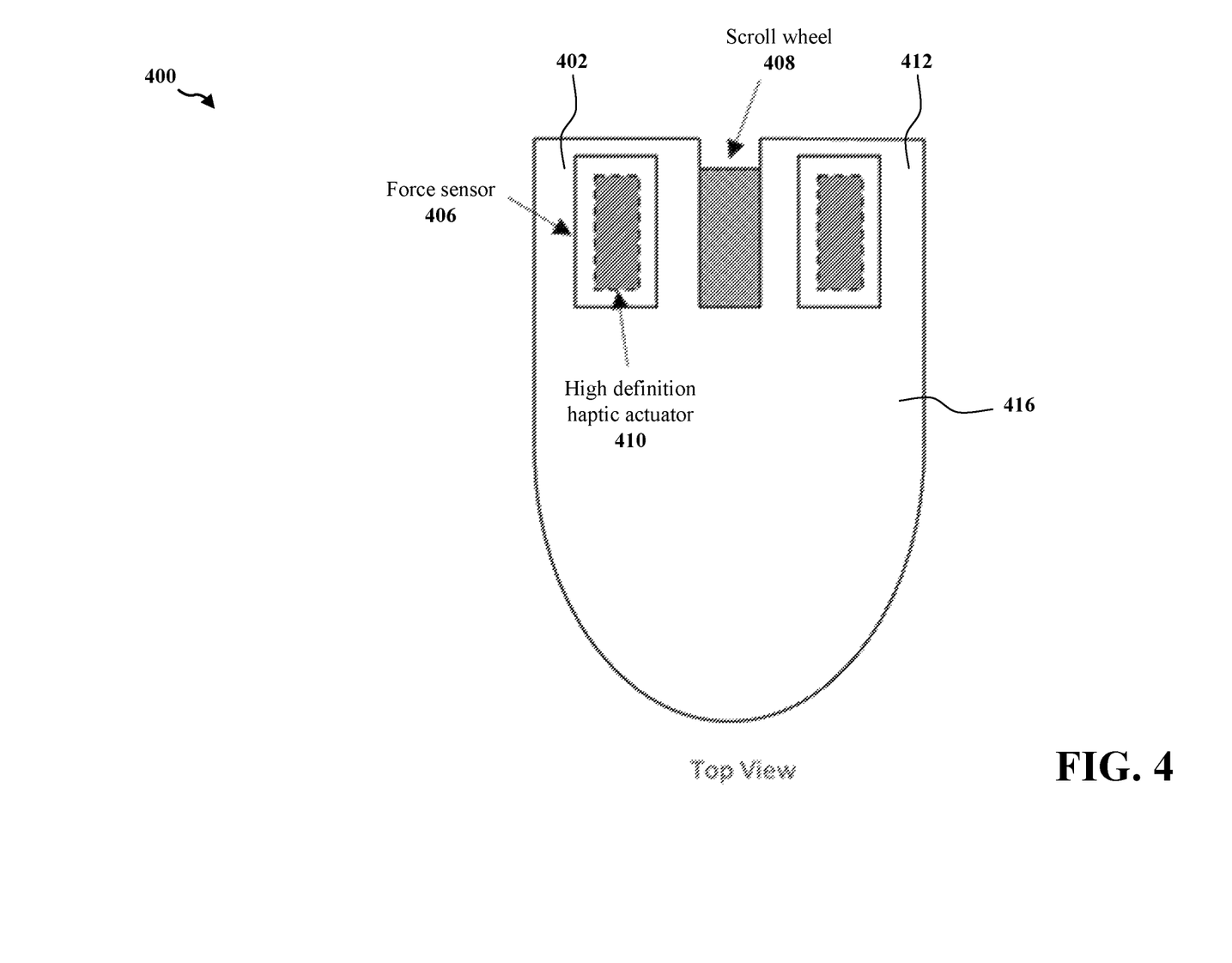
FIG. 4 is a diagram illustrating a top view of an example of a computer mouse that may provide customized tactile feedback.

FIG. 4 is a diagram illustrating a top view of an example of a computer mouse 400 that may provide customized tactile feedback. In one embodiment, the mouse 400 may be the mouse 300 described above with reference to FIG. 3. As illustrated, the mouse 400 may have two buttons 402 and 412. A scroll wheel 408 may be located between the buttons 402 and 412. In one embodiment, the buttons 402 and 412 may be part of the top shell 416 of the mouse 400.

The button 402 may have an associated force sensor 406 and a haptic actuator 410. The button 402 may be slightly flexible in that it transfers any force applied to it to the force sensor 406 below. The haptic actuator 410 may be located below the button 402 such that it may transmit the tactile feedback to the button 402. In one embodiment, the force sensor 406 may be the force sensor 304 described above with reference to FIG. 3, and the haptic actuator 410 may be the haptic actuator 306 described above with reference to FIG. 3. The button 412 may have a similar arrange.

In one embodiment, when the button 402 is pressed, the force sensor 406 may detect a force. In response to the detected force, the haptic actuator 410 may generate a tactile feedback based on a force curve (e.g., the force curve 202) associated with the button 402.

In one embodiment, the force curve of the button 402 may be set or customized. In one embodiment, the customization of the force curve may include the customization of actuation point and/or the customization of the rebound point. For example, the force threshold for actuation and/or the displacement threshold for actuation may be set or adjusted to reflect the preference of a user or an application.

In one embodiment, there may be little or no actual displacement of the button when the button is pressed. In such an embodiment, the displacement of the button may be measured by the perceived travel or displacement of the button. For example, in a traditional mouse button, the force exerted by the user on the button causes displacement which leads to pressing of the switch. In one embodiment of this disclosure, the force increase on the mouse is detected by a force sensor which actuates the button when the actuation force is achieved, rather than a physical movement of the button. However, the user may feel like there is a displacement due to the fact that she is gradually increasing the force on the button until the actuation point is reached.

In one embodiment, the perceived displacement of the button may be measured by the duration of the button being pressed. In such an embodiment, the displacement threshold for actuation may be a first duration threshold and the reset displacement threshold may be a second duration threshold. The second duration threshold may be greater than the first duration threshold. For example, when the duration of the button being pressed is greater than the first duration threshold, the displacement threshold for actuation is satisfied; when the duration of the button being pressed is greater than the second duration threshold, the reset displacement threshold is satisfied.

In one embodiment, the perceived displacement of the button may be measured by the force applied on the button. In such an embodiment, the perceived displacement of the button may be a function of the force applied on the button.

In one embodiment, different force curve profiles or click feels may be defined for different purposes and applied accordingly. For example, higher (e.g., than default) force threshold for actuation may be configured for a curve profile for first-person shooter (FPS) games to avoid accidental actuations; and lower (e.g., than default) force threshold for actuation may be configured for a curve profile for multi-player online battle arena (MOBA) games. In one embodiment, different actuation and rebound points may be defined for different purposes and applied accordingly.

In one embodiment, the force curve of a button may be set or adjusted by a user using a software according to the user's preference. In one embodiment, the device manufacturer may include preset force curve settings which the user may pick from.

In one embodiment, to resemble a mechanical button even more closely, there could also be audio feedback through a speaker built into the mouse or otherwise coupled to the mouse. Using a digital signal processor, the tactile feedback may be generated from the sound of the click, making the tactile feedback and the sound of the click seamless and giving users another way to set or adjust the tactile feedback besides changing the force curve. In one embodiment, the volume and/or the pitch of the sound of click may be set or adjusted to generate different tactile feedbacks. In one embodiment, the tactile feedback may be generated by the speaker built into the mouse or otherwise coupled to the mouse.

In one embodiment, different tactile feedback profiles (e.g., as defined by different force curves) may be saved for different uses. For example, a tactile feedback profile with a lighter click actuation may be saved for MOBA games, or a tactile feedback profile with a harder click actuation may be saved for FPS games to avoid accidental clicks.

Figure 5:
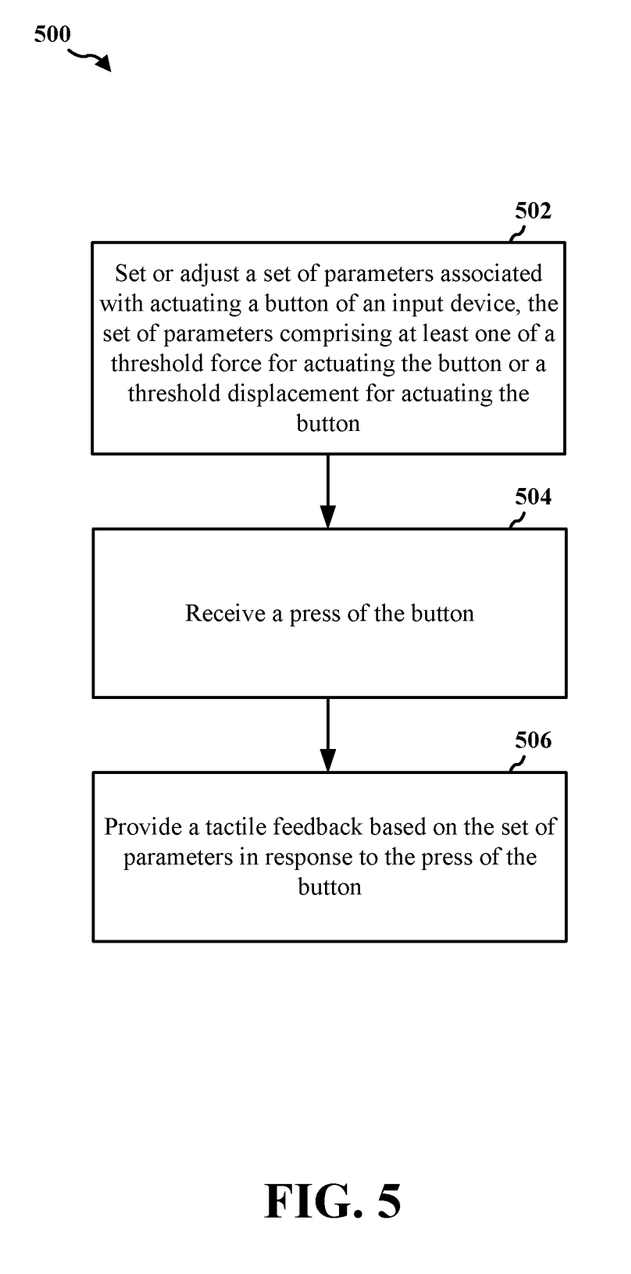
FIG. 5 is a flowchart of a method of customizing an input device.

FIG. 5 is a flowchart 500 of a method of customizing an input device. In one embodiment, the input device may be a pointing device, which may be one of a mouse, a trackball, a joystick, a WiiMote, or a touchpad. The method may be performed by the input device or a processor-based device coupled to the input device (e.g., the mouse 100, 300, 400, or the apparatus 602/602').

At 502, the device may set or adjust a set of parameters for actuating a button of the input device. The set of parameters may include at least one of a threshold force for actuating the button or a threshold displacement for actuating the button. In one embodiment, the set of parameter may represent a tactile feedback profile of the device. In one embodiment, the set of parameter may represent a force curve associated with the button.

In one embodiment, the set of parameters may be set or adjusted based on the type of use of the input device. In one embodiment, the set of parameters may be set or adjusted based on the application for which the input device is used. In one embodiment, the set of parameters may further include a rebound point for resetting the button after actuation.

At 504, the device may receive a press of the button. In one embodiment, the press of the button may be detected by a force sensor (e.g., the force sensor 304 or 406). In one embodiment, the device may further measure the force applied by the press of the button. In one embodiment, the device may further measure the duration of the press of the button.

At 506, the device may provide a tactile feedback based on the set of parameters in response to the press of the button. In one embodiment, to provide the tactile feedback based on the set of parameters, the device may trigger the tactile feedback when the press of the button satisfies at least one of the threshold force or the threshold displacement.

In one embodiment, the threshold force may be satisfied when a force applied by the press of the button is greater than or equal to the threshold force. In one embodiment, the device may detect the force applied by the press of the button using a sensor configured to measure force applied to the button.

In one embodiment, the threshold displacement may be satisfied when a displacement of a surface of the button caused by the press of the button is greater than or equal to the threshold displacement. In one embodiment, the threshold displacement may be a threshold of perceived displacement. The threshold of perceived displacement may be satisfied when a duration of the press of the button is greater than or equal to a threshold duration. In one embodiment, the device may determine the duration of the press of the button using a sensor or a circuit.

In one embodiment, to provide the tactile feedback, the device may generate the tactile feedback using a haptic actuator (e.g., the haptic actuator 306 or 410). In one embodiment, to provide the tactile feedback, the device may generate an audio feedback through a speaker of the device, and the tactile feedback may be generated from the audio feedback. In one embodiment, the device may further set or adjust the audio feedback based on the press of the button to set or adjust the tactile feedback.

Figure 6:
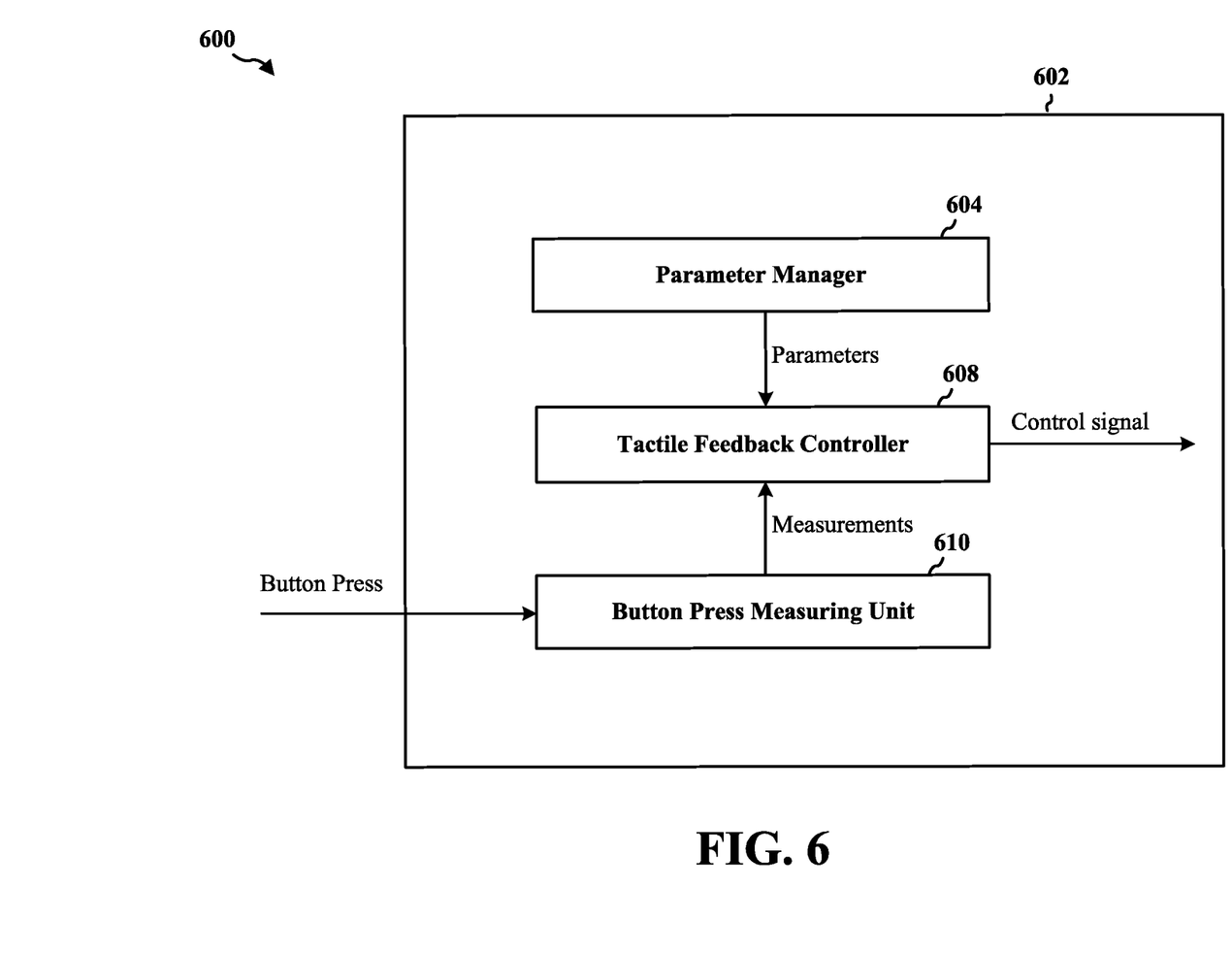
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus 602 may be an input device or a computing device coupled to the input device. In one embodiment, the apparatus 602 may be the mouse 300 or 400 described above. The apparatus 602 may include a parameter manager 604 that sets or adjusts a set of parameters associated with actuating a button of the apparatus. In one embodiment, the parameter manager 604 may perform the operations described above with reference to 502 in FIG. 5.

The apparatus 602 may include a button press measuring unit 610 that detect a press of the button and take measurements regarding the press of the button. In one embodiment, the measurements may include the force applied by the press of the button and/or the duration of the button being pressed. In one embodiment, the button press measuring unit 610 may perform the operations described above with reference to 504 in FIG. 5.

The apparatus 602 may include a tactile feedback controller 608 that provides a tactile feedback based on the parameters provided by the parameter manger 604 and the measurements provided by the button press measuring unit 610. In one embodiment, the tactile feedback controller 608 may output a control signal to a haptic actuator. In one embodiment, the tactile feedback controller 608 may output a control signal to a speaker within or coupled to the apparatus. In one embodiment, the tactile feedback controller 608 may perform the operations described above with reference to 506 in FIG. 5.

The apparatus 602 may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
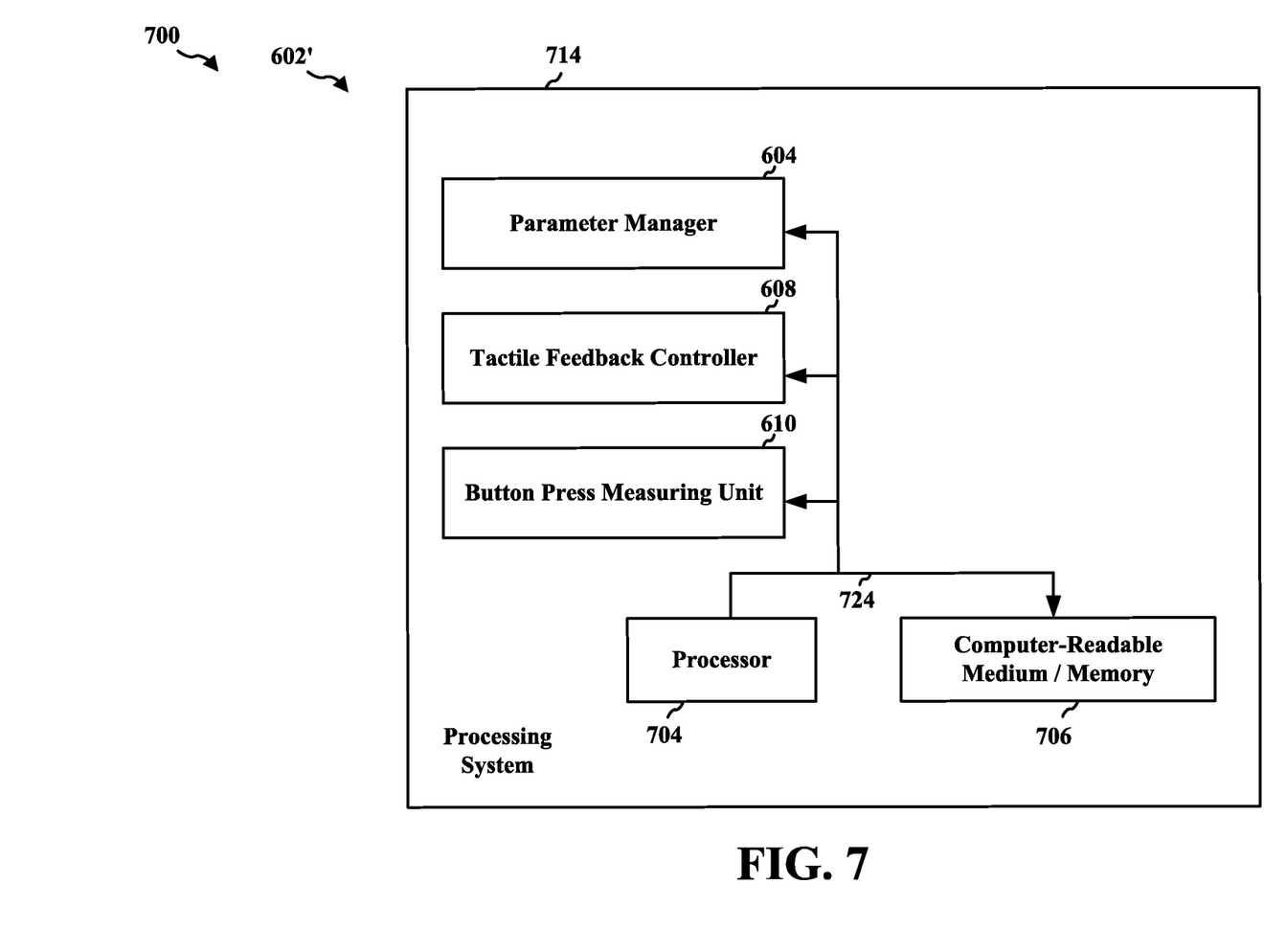
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 608, 610, and the computer-readable medium/memory 706. The bus 724 may also link various other circuits such as timing sources, peripherals, voltage regulators, and power management circuits, which are well known in the art, and therefore, will not be described any further.

The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 608, 610. The components may be software components running in the processor 704, resident/stored in the computer readable medium/memory 706, one or more hardware components coupled to the processor 704, or some combination thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of customizing an input device, comprising:
    setting a set of parameters associated with actuating a button of the input device, the set of parameters comprising at least one of a threshold force for actuating the button or a threshold displacement for actuating the button, wherein actuating the button occurs when an actuation point on a force curve is reached;
    registering a pressing of the button using a force sensor located below a top surface of the input device for actuating the button;
    providing a tactile feedback using a haptic actuator located below the force sensor, based on the set of parameters in response to the pressing of the button;
    setting a rebound point on the force curve for resetting the button;
    storing the tactile feedback as tactile feedback profiles of a user; and
    automatically switching tactile feedback profiles when the user launches a game or application.

2. The method of claim 1, wherein the providing the tactile feedback based on the set of parameters comprises triggering the tactile feedback when the press of the button satisfies at least one of the threshold force or the threshold displacement.

3. The method of claim 2, wherein the threshold force is satisfied when a force applied by the press of the button is greater than or equal to the threshold force.

4. The method of claim 3, further comprising detecting the force applied by the press of the button using a sensor configured to measure force applied to the button.

5. The method of claim 2, wherein the threshold displacement is satisfied when a displacement of a surface of the button caused by the press of the button is greater than or equal to the threshold displacement.

6. The method of claim 2, wherein the threshold displacement is a threshold of perceived displacement, wherein the threshold of perceived displacement is satisfied when a duration of the press of the button is greater than or equal to a threshold duration.

7. The method of claim 6, further comprising determining the duration of the press of the button using a sensor or a circuit.

8. The method of claim 1, wherein the providing the tactile feedback comprises generating an audio feedback through a speaker of the input device, wherein the tactile feedback is generated from the audio feedback.

9. An apparatus for customization, the apparatus being an input device with a button, comprising:
    a force sensor located below a top surface of the input device to register a pressing of the button for actuating the button;
    a haptic actuator located below the force sensor;
    a memory; and
    at least one processor coupled to the memory and configured to:
        set a set of parameters associated with actuating the button of the input device, the set of parameters comprising at least one of a threshold force for actuating the button or a threshold displacement for actuating the button, wherein actuating the button occurs when an actuation point on a force curve is reached;
        set a rebound point on the force curve for resetting the button;
        provide a tactile feedback by the haptic actuator, based on the set of parameters in response to the pressing of the button;
        storing the tactile feedback as tactile feedback profiles of a user; and
        automatically switching tactile feedback profiles when the user launches a game or application.

10. The apparatus of claim 9, wherein, to provide the tactile feedback based on the set of parameters, the at least one processor is configured to trigger the tactile feedback when the press of the button satisfies at least one of the threshold force or the threshold displacement.

11. The apparatus of claim 10, wherein the threshold force is satisfied when a force applied by the press of the button is greater than or equal to the threshold force.

12. The apparatus of claim 11, wherein the at least one processor is further configured to detect the force applied by the press of the button using a sensor configured to measure force applied to the button.

13. The apparatus of claim 10, wherein the threshold displacement is satisfied when a displacement of a surface of the button caused by the press of the button is greater than or equal to the threshold displacement.

14. The apparatus of claim 10, wherein the threshold displacement is a threshold of perceived displacement, wherein the threshold of perceived displacement is satisfied when a duration of the press of the button is greater than or equal to a threshold duration.

15. The apparatus of claim 14, wherein the at least one processor is further configured to determine the duration of the press of the button using a sensor or a circuit.

16. The apparatus of claim 9, wherein, to provide the tactile feedback, the at least one processor is configured to generate an audio feedback through a speaker of the input device, wherein the tactile feedback is generated from the audio feedback.

17. A non-transitory computer-readable medium storing computer executable code, comprising instructions for:

setting a set of parameters associated with actuating a button of an input device, the set of parameters comprising at least one of a threshold force for actuating the button or a threshold displacement for actuating the button, wherein actuating the button occurs when an actuation point on a force curve is reached;

registering a pressing of the button using a force sensor located below a top surface of the input device for actuating the button;

providing a tactile feedback using a haptic actuator located below the force sensor, based on the set of parameters in response to the pressing of the button;

setting a rebound point on the force curve for resetting the button;

storing the tactile feedback as tactile feedback profiles of a user; and automatically switching tactile feedback profiles when the user launches a game or application.

18. The non-transitory computer-readable medium of claim 17, wherein the instructions for providing the tactile feedback based on the set of parameters comprises instructions for triggering the tactile feedback when the press of the button satisfies at least one of the threshold force or the threshold displacement.

* * * * *